United States Patent
Salo et al.

(10) Patent No.: US 7,421,436 B2
(45) Date of Patent: Sep. 2, 2008

(54) DECENTRALIZED MANY-TO-MANY RELATIONSHIP MANAGEMENT IN AN OBJECT PERSISTENCE MANAGEMENT SYSTEM

(75) Inventors: Timo J. Salo, Apex, NC (US); Kevin J. Williams, Colorado Springs, CO (US)

(73) Assignee: International Business Machines Corporation, Armonk, NY (US)

( * ) Notice: Subject to any disclaimer, the term of this patent is extended or adjusted under 35 U.S.C. 154(b) by 380 days.

(21) Appl. No.: 10/026,387

(22) Filed: Dec. 21, 2001

(65) Prior Publication Data

US 2003/0120628 A1   Jun. 26, 2003

(51) Int. Cl.
*G06F 17/30* (2006.01)
*G06F 7/00* (2006.01)

(52) U.S. Cl. .................. 707/100; 707/101; 707/102; 707/3; 707/1

(58) Field of Classification Search ........ 707/10–104.1, 707/103 R, 1
See application file for complete search history.

(56) References Cited

U.S. PATENT DOCUMENTS

| | | | | |
|---|---|---|---|---|
| 5,369,570 A * | 11/1994 | Parad | ............................. | 705/8 |
| 5,386,557 A * | 1/1995 | Boykin et al. | ................... | 707/1 |
| 5,499,371 A * | 3/1996 | Henninger et al. | .......... | 707/102 |
| 5,566,333 A * | 10/1996 | Olson et al. | .................. | 707/102 |
| 5,706,494 A * | 1/1998 | Cochrane et al. | ............... | 707/2 |
| 5,717,924 A * | 2/1998 | Kawai | ........................ | 707/102 |
| 5,724,575 A * | 3/1998 | Hoover et al. | .................. | 707/10 |
| 5,742,806 A * | 4/1998 | Reiner et al. | .................... | 707/3 |
| 5,765,195 A * | 6/1998 | McDonald | .................. | 711/141 |
| 5,819,086 A * | 10/1998 | Kroenke | ..................... | 707/102 |
| 5,819,289 A * | 10/1998 | Sanford et al. | ............ | 707/104.1 |
| 5,933,831 A * | 8/1999 | Jorgensen | .................... | 707/100 |
| 6,035,300 A * | 3/2000 | Cason et al. | ................. | 707/102 |
| 6,101,502 A * | 8/2000 | Heubner et al. | ......... | 707/103 R |
| 6,199,195 B1 * | 3/2001 | Goodwin et al. | ............ | 717/104 |
| 6,279,008 B1 * | 8/2001 | Tung Ng et al. | ............. | 707/102 |
| 6,289,334 B1 * | 9/2001 | Reiner et al. | .................... | 707/3 |
| 6,356,897 B1 * | 3/2002 | Gusack | .......................... | 707/4 |
| 6,418,448 B1 * | 7/2002 | Sarkar | ...................... | 707/104.1 |
| 6,421,683 B1 * | 7/2002 | Lamburt | .................. | 707/104.1 |
| 6,578,056 B1 * | 6/2003 | Lamburt | ......................... | 707/7 |
| 6,704,744 B1 * | 3/2004 | Williamson et al. | ......... | 707/101 |
| 6,704,745 B2 * | 3/2004 | Della-Libera et al. | ... | 707/103 R |
| 6,708,179 B1 * | 3/2004 | Arora | .......................... | 707/102 |
| 6,766,518 B1 * | 7/2004 | Bernstein et al. | ............ | 719/315 |

(Continued)

*Primary Examiner*—John Breene
*Assistant Examiner*—Anh Ly
(74) *Attorney, Agent, or Firm*—A. Bruce Clay, Esq.; Steven M. Greenberg, Esq.; Cary Rodriguez & Paul LLP

(57) ABSTRACT

A many-to-many relationship management system. In an object persistence management system, a many-to-many relationship manager can include one or more related objects; a junction table storing relationships between the related objects; and, one or more corresponding links. Each link can correspond to one of the objects. Furthermore, each link can persist state information for the corresponding object in an associated object table. Finally, each link can manage the junction table responsive to changing relationships with others of the related objects. Importantly, as the present invention distributes the management of the junction table, a counter-operation management protocol can be provided which can resolve conflicts which arise in the management of the junction table in response to changing relationships among their associated objects.

3 Claims, 3 Drawing Sheets

U.S. PATENT DOCUMENTS

| | | | |
|---|---|---|---|
| 7,031,956 B1* | 4/2006 | Lee et al. | 707/3 |
| 7,072,896 B2* | 7/2006 | Lee et al. | 707/101 |
| 2002/0038304 A1* | 3/2002 | Gelfand | 707/100 |
| 2002/0065815 A1* | 5/2002 | Layden | 707/3 |
| 2002/0095408 A1* | 7/2002 | Cheng | 707/3 |
| 2002/0169788 A1* | 11/2002 | Lee et al. | 707/104.1 |
| 2002/0174082 A1* | 11/2002 | Miloushev et al. | 706/47 |
| 2003/0046272 A1* | 3/2003 | Scanzano et al. | 707/2 |
| 2003/0055822 A1* | 3/2003 | Yu | 707/6 |
| 2003/0120593 A1* | 6/2003 | Bansal et al. | 705/39 |
| 2003/0163439 A1* | 8/2003 | Hankin et al. | 707/1 |
| 2003/0167213 A1* | 9/2003 | Jammes et al. | 705/27 |
| 2004/0039798 A1* | 2/2004 | Hotz et al. | 709/219 |
| 2004/0243605 A1* | 12/2004 | Bernstein et al. | 707/100 |
| 2005/0138160 A1* | 6/2005 | Klein et al. | 709/223 |
| 2005/0182785 A1* | 8/2005 | Oswalt | 707/102 |

* cited by examiner

DECENTRALIZED MANY-TO-MANY RELATIONSHIP MANAGEMENT IN AN OBJECT PERSISTENCE MANAGEMENT SYSTEM

BACKGROUND OF THE INVENTION

1. Statement of the Technical Field

The present invention relates to the field of object state persistence and more particularly to many-to-many relationship management in an object persistence management system.

2. Description of the Related Art

As object-oriented technology has matured, it has proven to be an excellent solution for modeling problems, building prototypes, and rapidly deploying applications. Though object models for applications are often reused in other applications, one of the costlier tasks of development has been that of translating between object-oriented and non-object-oriented representations of application models. Consequently, the task of mapping objects both to non object oriented relational database tables and other non object oriented data sources has been the missing piece in object persistence management.

Conventional object persistence management systems typically include a collection of development browsers, tools, and code generation services that assist in the development of persistence support within object-oriented applications. Browsers are the main resources for building applications using the persistence management framework. In particular, browsers are used to describe object models, database schema, and data store mappings, as well as to generate source code need by the framework to manage objects in the model. Conventional object persistence management systems can include several browsers, including object model browsers, schema browsers and map browsers.

Object browsers can be used to define object models, its classes and associations. Schema browsers, by comparison, can be used to define a logical description of the data store to which the object model will persist. Importantly, map browsers can be used to map the object model, or persistent classes, to the logical, database schema. In particular, each persistent class requires a map which associates the attributes of the class with their corresponding columns or fields in the database tables or records thereof.

In that regard, present object persistence management systems provide for one-to-one, one-to-many and many-to-many relationship management. In the case of one-to-one and one-to-many relationship management, present object persistence management systems provide decentralized, loosely coupled agents, referred to herein as "links", to manage each side of the relationship. In particular, each link manages the state of an object in the relationship and coordinates with a corresponding "counter-link" when necessary, as is well-known in the art.

Part of the relationship management process can include the management of the persistent state of the relationship. The management of the persistent state of the relationship can be relatively straightforward in the case of one-to-one and one-to-many relationships since the state of the relationship can be included as part of the state of the related objects themselves. Hence, if the links have correctly managed the related objects, when the objects are stored to an underlying database, the state of the relationship also will be stored.

A typical method used to store or persist the state of objects and their relationships in a one-to-one or one-to-many relationship can include using tables in a relationship database—one for each object in the relationship. In each table, a particular field can be used as a state reference in the other tables. For example, consider an object model of a class and an instructor having a one-to-one relationship with one another. A table can be constructed for all possible instructors, each instructor having a unique ID. A corresponding table can be constructed for all classes, each class having a reference to the unique ID of its instructor.

In this example, the values for the class reference to a unique instructor ID can dynamically change according to the state of the associated class and instructor objects at the time those objects are stored in the database. If the relationship management system correctly maintains the state of the related objects as their relationships change, then the relationships can be correctly stored to the underlying database when the objects are saved to a data store. If the saved objects are later restored from the data store, then the relationships also can be correctly restored.

Unlike one-to-one and one-to-many relationships, storing the state of many-to-many relationships is not as straightforward. This is so because a third, auxiliary table, referred to hereinafter as a "junction table", typically is required to store the relationship information. For example, if multiple students are enrolled in multiple classes in an instructor-class-student model, a many-to-many relationship will have been created as between the students and their respective classes in which they are enrolled.

In consequence, a junction table unrelated to any particular object will be required in order to track those students enrolled in the multiplicity of classes at any one time. Specifically, each record in the junction table can include two fields linking the unique ID of a student with the unique ID of a class in which the student is enrolled. These records typically are referred to as "key-pair entries". Of course, the junction table can include multiple key-pair entries for each student, each key-pair entry reflecting only one of the several classes in which the student may be enrolled.

Since the management of many-to-many relationships requires the management of a third, auxiliary entity apart from the related entities, the links managing the relationship between the related objects must be concerned not only with the state of the related objects, but also with the state of the third, auxiliary entity. One common approach to solving the problem of managing the junction table includes introducing a relationship manager responsible for updating key-pair entries in the junction table. As links to either side of the relationship detect relationship changes, the links inform the relationship manager of the change. In consequence, the relationship manager can ensure that the junction table has been updated accordingly.

Significantly, the common solution to managing many-to-many relationships in an object model can require the addition of substantial infrastructure to the run-time portion of the object persistence management system. This is so because typical object persistence management systems are designed such that only application entities such as the links provide state data to be flushed to the database. Conversely, only application entitles can be retrieved from the database. The relationship manager, however, is not an application entity. Rather, the relationship manager merely is an artifact required to record the relationship state for many-to-many associations.

The decentralization of the management of the junction table, heretofore, has been complicated by potential conflicts which can arise when persisting state changes in related objects to their associated object tables. For instance, links typically can buffer state changes prior to their persistence in a table. When buffering the addition of a relationship, the link can buffer the operation, "add [key-pair entry]". Conversely, when buffering the removal of a relationship, the link can buffer the operation, "remove [key-pair entry]".

In both cases, however, it is possible that a corresponding link which manages the other portion of the relationship also can buffer the management operations pertaining to the key-pair entry. Specifically, it is possible that one link which manages the state of object1 buffers the operation, "add [object1, object2]", while the link which manages the state of object 2 buffers the operation, "remove[object1, object2]. When persisting the state of object1 and object 2, however, the timing of performing each buffered operation can undermine the integrity of the junction table.

Specifically, where the buffered operations of the link which manages object 2 are performed prior to the buffered operations of the link which manages object1, a conflict can arise. In consequence, despite the apparent disadvantages of the centralized management of the junction table, the relationship manager can be required to avoid such conflicts. Thus, there exists a need for a many-to-many relationship management system in which timing conflicts can be managed notwithstanding the absence of a centralized relationship manager.

SUMMARY OF THE INVENTION

The present invention is a many-to-many relationship management system which overcomes the deficiencies of the prior art many-to-many relationship management systems which depend upon an auxiliary relationship manager. In the object persistence management system of the present invention, a many-to-many relationship manager can include one or more related objects; a junction table storing relationships between the related objects; and, one or more corresponding links.

Each link can correspond to one of the objects. Furthermore, each link can persist state information for the corresponding object in an associated object table. Finally, each link can manage the junction table responsive to changing relationships with others of the related objects. Importantly, as the present invention distributes the management of the junction table, a counter-operation management protocol can be provided which can resolve conflicts which arise in the management of the junction table in response to changing relationships among their associated objects.

The counter-operation management protocol can remove conflicted state information in the corresponding links without persisting the conflicted state information in the junction table. In particular, each of the corresponding links can include a state management operations buffer, the buffer storing directives for adding selected key-pair entries to and removing selected key-pair entries from the junction table. The counter-operation management protocol can include an interface through which operations in the buffer and corresponding counter-operations in associated buffers of related links can be identified and removed. Specifically, each counter-operation can specify a junction table management operation for a particular key-pair entry in the associated buffer which is opposite to an operation in the buffer which specifies a junction table management operation also for the particular key-pair entry.

In one aspect of the invention, a method of managing a many-to-many relationship in an object persistence management system can include detecting a relationship change with a related object. Upon detecting a relationship change, a directive can be stored in a buffer, the directive specifying a management operation for changing the relationship in a junction table. Notably, the stored directive can be performed only if an opposite directive has not been stored in a buffer associated with the related object.

Notably, the storing step can include storing a directive in the buffer which specifies one of adding or removing a key-pair entry in the junction table. In that regard, the performing step can include performing the specified adding or removing of the key-pair entry only if a corresponding opposite directive specifying a respective removing or adding of the key-pair entry is not detected in the buffer of the associated object. In that regard, if a corresponding opposite directive is detected, both the directive and opposite directive can be removed from both of the buffers.

BRIEF DESCRIPTION OF THE DRAWINGS

There are shown in the drawings embodiments which are presently preferred, it being understood, however, that the invention is not limited to the precise arrangements and instrumentalities shown, wherein.

DETAILED DESCRIPTION OF THE PREFERRED EMBODIMENTS

The present invention is a decentralized many-to-many relationship management system. In the many-to-many relationship management system of the present invention, links which traditionally manage the objects in a one-to-one and one-to-many relationship, also can manage the related objects in a many-to-many relationship. Specifically, the links can collaborate with one another by providing updates to the junction table without the assistance of a non-application, auxiliary relationship manager. Notably, unlike conventional many-to-many relationship management systems in which a centralized relationship manager manages the junction table, in the present invention, the responsibility for maintaining the junction table can be distributed amongst the links.

Each of the links in the many-to-many relationship management system of the present invention can have an association with an object as the persistence manager for that object and, as such, can be considered an application entity. In consequence, the persistent state information managed by each link can be stored to and retrieved from data storage using the conventional flush and hydration mechanisms of preexisting conventional object persistence management systems. Thus, by eliminating the need for a centralized relationship manager, the complexity of managing many-to-many relationships can be dramatically reduced.

Finally, inasmuch as a conflict of flush and hydration operations can arise on opposite sides of a many-to-many association, a counter-operation process can be provided in accordance with the present invention. The counter-operation process can be performed in each of the links in the many-to-many relationship prior to the persistence of object states managed by each side of the many-to-many association. Specifically, prior to performing individual flush and hydration operations wherein the state of the managed objects are written to or deleted from their associated object tables, each managing link can inspect its own operational buffer and the operational buffer of the another to locate operations in both which run counter to one another. Where identified, these operations can be removed from the buffer without performing the corresponding individual flush or hydration operation. In this way, potential conflicts within the many-to-many relationship can be avoided.

Figure 1:
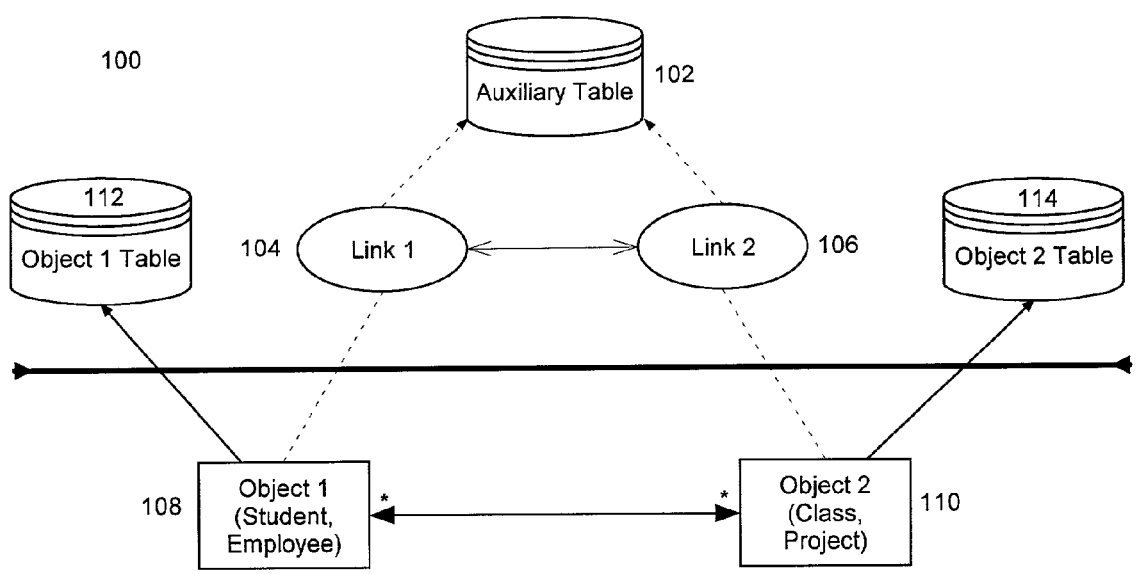
FIG. 1 is a schematic illustration of a decentralized many-to-many relationship management system.

FIG. 1 is a schematic illustration of the decentralized many-to-many relationship management system of the present invention. As illustrated in FIG. 1, the system can include two or more objects 108, 110 having a many-to-many object relationship. An example of two such objects can include the object relationship between classes in which students can enroll, and students who can enroll in classes. Other examples can include the object relationship between projects to which employees can be assigned, and employees who can work on projects.

In accordance with the inventive arrangements, an object persistence management system 100 can be included which can ensure the persistence of the object state in each object 108, 110 managed by the system 100. More particularly, links 104, 106 can be provided which can ensure the integrity of the state of the related objects 108, 110 in the many-to-many relationship. The links 104, 106 can be application entities which coordinate state changes among the related objects 108, 110 and whose coordinated states can be flushed to a data store and hydrated from a data store, for instance tables 112, 114.

The many-to-many relationships can be recorded in a junction table 102. Specifically, the junction table 102 can store the state of the many-to-many relationship between the objects 108, 110 as is the case in a conventional junction table. Importantly, however, a centralized relationship manager does not manage the addition and deletion of data to and from the junction table 102, respectively. Rather, in the present invention each link 104, 106 of the many-to-many relationship management system can manage the auxiliary table 102, thus eliminating the requirement that an artifact, non-application entity manage the auxiliary table 102. Specifically, the links 104, 106 can manage the auxiliary table 102 according to an agreed-upon management protocol.

Figure 2:
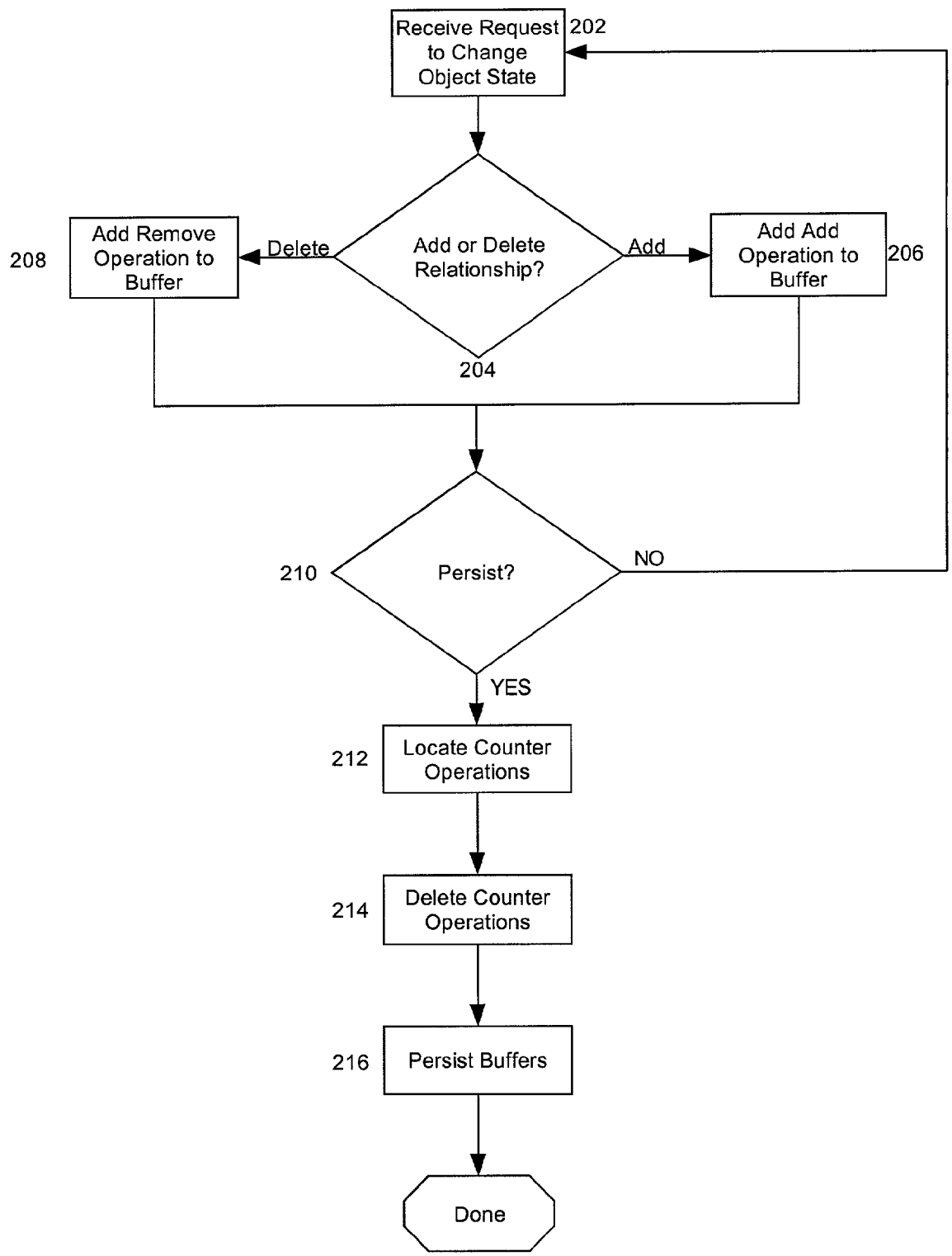
FIG. 2 is a flow chart illustrating a process for managing state changes in the decentralized many-to-many relationship management system of FIG. 1.

FIG. 2 is a flow chart illustrating the management of state changes in a primary link the decentralized many-to-many relationship management system of FIG. 1. Importantly, by "primary link", it is meant that the object managed by the primary link enjoys a many-to-many relationship with other objects managed by corresponding secondary links. Of course, as one skilled in the art will recognize, each secondary link, from the perspective of their managed objects, in of themselves can be primary links. Hence, the term primary link is referred to herein only as a matter of semantic convenience and not as a matter of operational distinction between the objects in a many-to-many relationship.

Beginning in block 202, the primary link can detect a request to change the state of its associated object by altering the object's relationship with another related object. For instance, the request can be a request to add a new relationship as in the case of enrolling a student in a new class (Class.Add (Student) or Student.Add(Class)), or removing an employee from an existing project (Project.Remove(Employee) or Employee.Remove(Project)). In any case, in decision block 204, it can be determined whether the request is one to add or delete a relationship.

If the request is a request to add a new relationship, in block 206 the primary link can change its internal state to reflect the new relationship with the related object.

Specifically, the link can buffer the operation, "add [new key-pair entry]" to reflect the new relationship. By comparison, if in decision block 204 the request to change the object state is determined to be a request to delete a relationship between two objects, in block 208 the primary link can change its internal state to remove the relationship with the related object managed by the secondary link. In particular, as before the primary link can buffer the operation, "remove [existing key-pair entry]".

In decision block 210, if the state of object managed by the primary link is not to be persisted, the process can continue in block 202 wherein additional object state changes can be processed in the primary link. If, however, in decision block 210, the state of the object managed by the primary link is to be persisted, in block 212, the buffers of each secondary link associated with the primary link in a many-to-many relationship can be inspected for counter-operations to those operations stored in the buffer of the primary link.

Where counter-operations in a secondary link are identified, both the primary link and secondary link can remove the operation and corresponding counter-operation from their respective buffers in step 214. Finally, in step 216, those remaining operations in the buffer of the primary link can be persisted to the junction table. Notably, though the counter-operation process of FIG. 2 is shown to occur subsequent to a decision to persist the state of the link, in a preferred embodiment, the counter-operation process illustrated in steps 212 through 216 can be performed in response to a decision to add or remove an operation to the link buffer.

Figure 3:
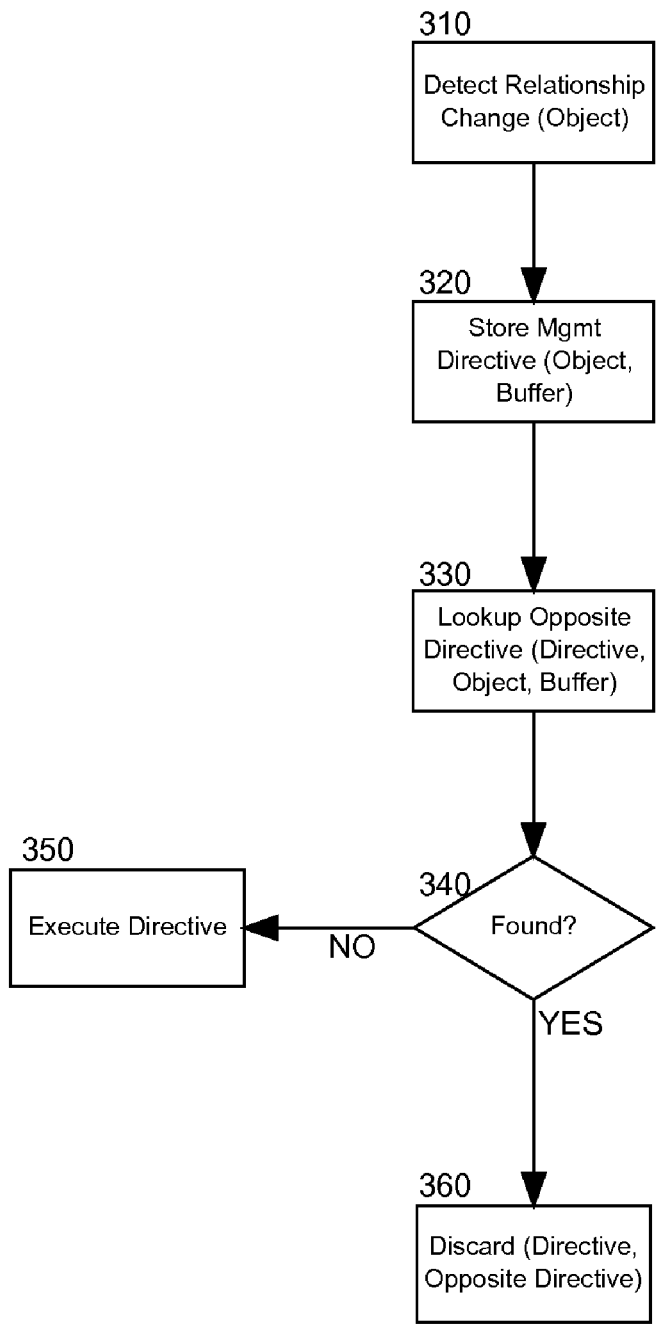
FIG. 3 is a flow chart illustrating a process for managing a many-to-many relationship in an object persistence management system.

Referring to FIG. 3, a method of managing a many-to-many relationship in an object persistence management system is disclosed. In block 310, a relationship change with a related object is detected. In block 320, a directive specifying a management operation, such as "add [new key-pair entry]," for changing the relationship in a junction table is stored in a buffer. In blocks 330 and 340, a search is conducted for an opposite directive, such as "remove [existing key-pair entry]," in a buffer associated with the related object. In block 350, the stored directive is performed only if the opposite directive has not been stored in the buffer associated with said related object. In block 360, if the opposite directive is found, both the directive and opposite directive are discarded.

Importantly, because the management of the junction table has been decentralized in the present invention, the need for a centralized relationship manager has been eliminated in accordance with the inventive arrangements. Yet, the conflicts which can arise from decentralized management of the junction table can be avoided in the present invention by virtue of the counter-operation process performed prior to the persistence of object states in the junction table. As a result, the complexity of the object persistence management system can be significantly reduced.

The present invention can be realized in hardware, software, or a combination of hardware and software. An implementation of the method and system of the present invention can be realized in a centralized fashion in one computer system, or in a distributed fashion where different elements are spread across several interconnected computer systems. Any kind of computer system, or other apparatus adapted for carrying out the methods described herein, is suited to perform the functions described herein.

A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which, when loaded in a computer system is able to carry out these methods.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Significantly, this invention can be embodied in other specific forms without departing from the spirit or essential attributes thereof, and accordingly, reference should be had to the following claims, rather than to the foregoing specification, as indicating the scope of the invention.

We claim:

1. A method of managing a many-to-many relationship in an object persistence management system comprising the steps of:

detecting a relationship change with a related object;

storing a directive in a buffer, said directive specifying a management operation for changing said relationship in a junction table; and, searching for an opposite directive in a buffer associated with said related object; and, performing said stored directive only if the opposite directive has not been stored in said buffer associated with said related object.

2. The method of claim 1, wherein said storing step comprises the step of storing a directive in said buffer which specifies one of adding or removing a key-pair entry in said junction table.

3. The method of claim 2, wherein said performing step comprises the steps of:

performing said specified adding or removing of said key-pair entry only if a corresponding opposite directive specifying a respective removing or adding of said key-pair entry is not detected in said buffer of said associated object; and, responsive to detecting said corresponding opposite directive, removing both said directive and opposite directive from both said buffers.

* * * * *